UNITED STATES PATENT OFFICE.

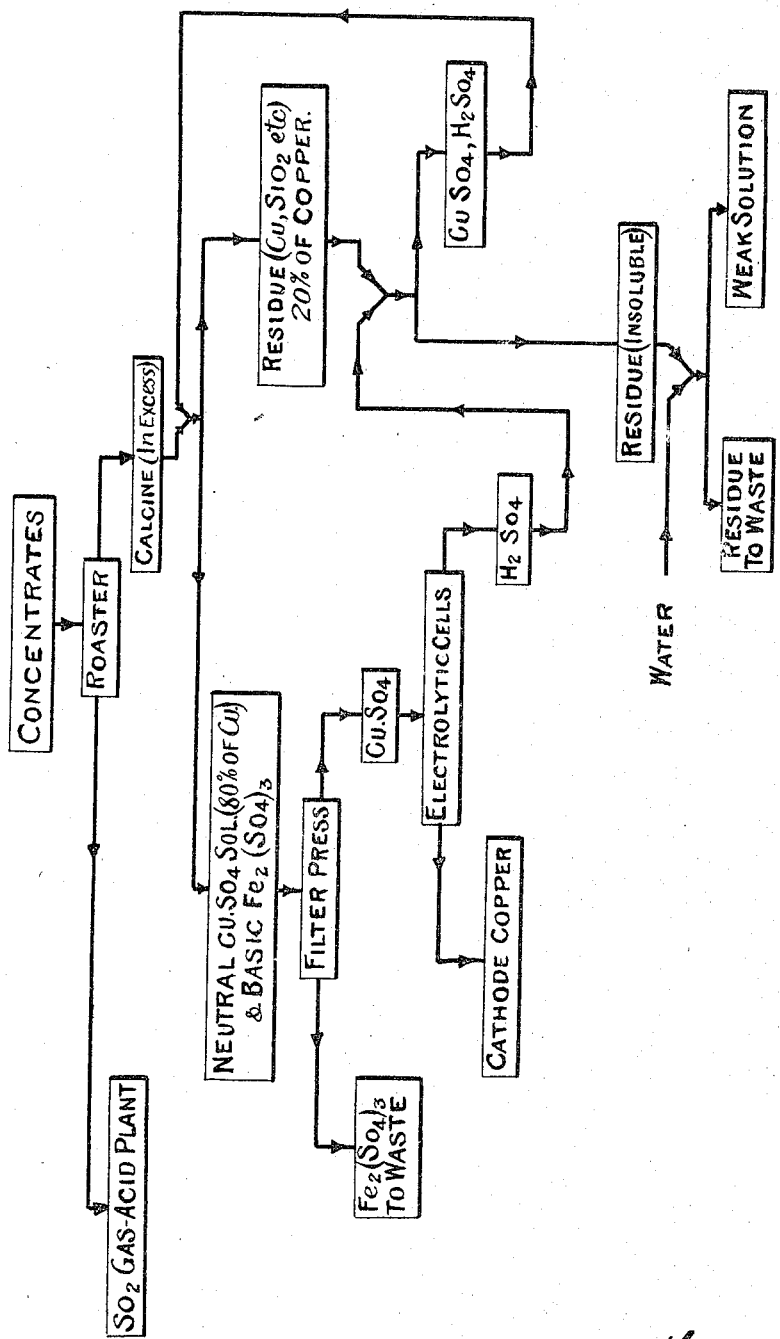

ELIAS A. C. SMITH, OF NEW YORK, N. Y.

METALLURGY OF COPPER.

1,134,767.  Specification of Letters Patent.  Patented Apr. 6, 1915.

Application filed February 10, 1913. Serial No. 747,244.

*To all whom it may concern:*

Be it known that I, ELIAS A. C. SMITH, a citizen of the United States, residing in the borough of Manhattan, city, county, and State of New York, have invented certain new and useful Improvements in the Metallurgy of Copper; and I do hereby declare the following to be a full, clear, and exact description of the invention, such as will enable others skilled in the art to which it appertains to make and use the same.

The present invention relates to certain new and useful improvements in the hydrometallurgy of copper, and particularly to the recovery of copper from low bearing copper ores.

The invention has for its chief application to the treatment of raw sulfid ores wherein the copper constituent, (as for instance, chalcopyrite, or chalcocite) is associated with iron in the form of ferrous sulfid.

In the practice of the invention, the copper is ultimately recovered as electrolytic copper, and the main purpose and object of the invention is to obtain as the electrolyte a solution wherein the quantity of iron present is reduced to a practically negligible minimum, thereby avoiding the harmful effect upon current efficiency in copper electrolysis attendant upon the presence of any material quantity of iron in the solution.

The practice of the invention, in its preferred form, likewise contemplates a cyclic process, in the sense that the spent electrolyte is regenerated by the electrolysis and is adapted to serve as a leaching solution for a new batch of roasted ore, as will hereinafter more fully appear. So also, the invention is so practised that, in the roasting operation to which the raw sulfid ore is subjected, a sufficient quantity of sulfuric acid is recovered for the uses of the process and for supplying any losses in acid that may be incident to the leaching and washing operations. Furthermore, the roasting operation is preferably so conducted that the gases from the roasting furnace shall contain a large percentage of $SO_3$, adapted to be absorbed in strong sulfuric acid, and produced by catalytic action within the furnace and the flues leading therefrom. Particularly, also, the roasting operation is so conducted as to render the iron contained in the ore insoluble for the most part in dilute sulfuric acid, so that it will not be taken up into solution with the copper by the leaching liquid to any material extent. Finally, as hereinbefore indicated, even such iron as may be dissolved out of the ore by the leaching solution is almost entirely removed before the solution passes to the electrolytic tanks for the recovery of the copper, the residue remaining therein as ferric sulfate during the electrolysis until the copper has been reduced to a low percentage; and even this residual quantity of ferric sulfate may be precipitated out as a basic sulfate if the solution is used as a leach solution during the step of the process hereinafter referred to as the neutralizing leaching. Alternately, however, it will be entirely feasible to continue the electrolysis until the electrolyte is so low in copper that the bulk of the dissolved iron will be present in the spent electrolyte as ferrous sulfate.

As a typical illustration of the practice of the invention, the following example may be given:—The raw sulfid ore to be treated is roasted in a seven-hearth rotary furnace of the general type of the well-known Wedge, McDougall, or Herreshoff construction, at a temperature of between 600° C. and 750° C. in the first five hearths, and 450° C. and 500° C. in the last two hearths. The object of the roasting in the first five hearths is to remove the sulfur and convert the ferrous sulfid (FeS) into ferrous oxid (FeO), which reaction takes place almost completely at the temperatures mentioned, and, at the same time, the copper compounds present are likewise completely oxidized. The ore then passes through the last two hearths, in which the ferrous oxid is almost completely converted into ferric oxid ($Fe_2O_3$), which oxid is practically insoluble in dilute sulfuric acid.

In the general practice of the invention, it is desirable to provide for the recovery of a sufficient amount of sulfuric acid to replace the amount lost during leaching operations. This may be effected, if desired, by providing a small lead chamber plant for the recovery of the acid from the furnace gases, but, in gerenal, it will be entirely feasible to so conduct the roasting operation that the $SO_3$ present in the gases is increased by catalytic action upon the $SO_2$ formed in the first five hearths, and to then absorb the $SO_3$ in strong sulfuric acid, in accordance with the approved practice of the well-known contact process for sulfuric acid recovery.

The ore is discharged from the roasting furnace and contains its copper in an oxidized form and its iron almost entirely in the form of ferric oxid. In this connection it should be particularly noted that one of the main purposes of the roasting, as hereinbefore indicated, is to convert the iron into a form insoluble in dilute sulfuric acid, and that no attempt is made to obtain a sulfatizing roast, nor could a sulfatizing roast be obtained at the same temperature required to oxidize the iron. The roasting is, however, conducted at the lowest feasible temperature to obtain the oxidation, in order to allow as much $SO_3$ to form as possible,—excessively high temperatures being attended with a certain amount of dissociation of $SO_3$, as is well understood.

Assuming that the cycle of operations is fully under way, a quantity of partially leached ore from which about 85% of the copper has been removed, in the step hereinafter referred to as the neutralizing leaching, is treated by agitation with the electrolyzed solution returned from the electrolytic vats. The solution thus employed will contain usually about 10 to 12% of free sulfuric acid, and say from 1.5% to 2.5% of copper, according to the extent to which the electrolysis has been carried. Practically all the copper still remaining in the partially-leached ore is taken into solution by this leach liquor, and also a very small amount of iron in the ferric state; the resulting solution is then drained into another agitating tank, where, in order to remove the ferric iron, a fresh batch of ore from the roasting furnace is added in sufficient quantity to neutralize practically all of the acid remaining in the solution. By this operation, the ferric iron taken up from the partially-leached ore by the acid electrolyzed solution, is precipitated as a basic sulfate of iron, while about 85% of the iron contained in the fresh batch of ore used in the neutralizing leaching is dissolved. The solution and the ore are then withdrawn to a settling tank, where the partially leached ore quickly separates out from the solution, which latter retains suspended therein, practically all of the basic iron salts. The solution is then immediately tapped off or siphoned off from the top of the ore before it has time to deposit any material part of its salts in the ore. It is then filter pressed, which removes the suspended iron salts and gives a clear electrolyte, almost devoid of iron salts, which electrolyte passes to the electrolytic tanks. In the electrolytic tanks, the copper is electrolyzed out of the solution between a practically insoluble or non-corrodible anode and a copper cathode. For the insoluble or non-corrodible anode, the usual lead anode, preferably having a small proportion of antimony may be employed. It has not always been possible to conduct the roasting operation in such manner that all of the iron present in the ore is converted into ferric iron; a small amount, say less than 1% will usually remain as ferrous iron, and, in the leaching which follows, this ferrous iron being much more readily soluble in sulfuric acid than the ferric iron will enter the solution. After the ferrous iron is in the solution, it will run through the operation up to the point of electrolysis. At a certain stage of the electrolysis, however, practically all of the iron present in the electrolyte is converted into ferric iron. If, now, it should be found desirable to remove the iron from the solution, the electrolysis can be stopped at this point, and the solution can be used over again in leaching, whereupon, in the neutralizing leaching, all of the iron in solution which is now in the ferric state, will be precipitated, even including the iron which originated from the ferrous iron present in the roasted ore. If the electrolysis is continued until the solution is very low in copper, the small amount of iron remaining dissolved in the solution will be re-converted into ferrous sulfate, which is not removable, as a basic sulfate in the neutralizing leaching.

In the preceding description, it has been assumed that the cycle of operations is fully under way, so that there is at hand a quantity of partially-leached ore, and also a quantity of regenerated electrolyte from a previous cycle. In order to begin the cycle, however, it is, of course, evident that a quantity of partially-leached ore and a quantity of the regenerated electrolyte, must be provided initially. This may be conveniently effected, as follows: A portion of the roasted ore may be leached with a solution of dilute sulfuric acid, the quantity of ore employed being such as to completely neutralize the acid. As a consequence, the iron will be precipitated as a basic sulfate of iron. The lixiviated ore will, in such case, yield about 85% of its copper to the solution, and will, accordingly, furnish the partially-leached ore for the beginning of the contemplated cycle. After a quick settling, the solution, before it has parted with its suspended particles of basic sulfate of iron, is quickly removed from the top of the ore, and is then filter pressed in order to remove the suspended basic salts of iron. It will thereupon constitute the electrolyte, so that the solution, when electrolyzed, will be regenerated to form the acid leach liquor required for acting upon the partially-leached ore in the first stage of the cycle.

It will, of course, be understood, that the neutralization of the free acid in the step of neutralizing leaching may be effected by any other oxids than roaster sulfid ore, as, for instance, by copper ore, in the form of a carbonate, or in the form of an oxid. In so far as that step of the operation is concerned, therefore, copper carbonate or copper oxid may be regarded broadly, as the equivalent for the roasted sulfid, especially in the series of steps constituting the cycle. In the accompanying drawing, for convenience of reference I have indicated diagrammatically the several steps of the operation. In fact, the drawing illustrates the flow-sheet of the process.

What I claim is:

1. In the art of recovering copper from ore in which it is associated with iron, the method of procedure, which comprises the preliminary step of roasting the ore under such conditions as to convert the bulk of the iron present into ferric oxid, leaching the ore with acid whereupon the small quantity of ferric iron not converted into insoluble ferric oxid by the roasting operation goes into solution in the leaching acid, and then neutralizing the acid of the solution by means of a quantity of oxidized ore, thereby precipitating the ferric iron as a basic sulfate of iron and at the same time leaching out copper from the ore thus added to the solution; substantially as described.

2. In the art of recovering copper from ore in which it is associated with iron, the method of procedure, which comprises the preliminary step of roasting the ore under such conditions as to convert the bulk of the iron present into ferric oxid, leaching the ore with acid whereupon the small quantity of ferric iron not converted into insoluble ferric oxid by the roasting operation goes into solution in the leaching acid, and then neutralizing the acid of the solution by means of a quantity of oxidized ore thereby precipitating the ferric iron as a basic sulfate of iron and at the same time leaching out copper from the ore thus added to the solution, and, after quick settling, promptly removing and filter-pressing the neutralized solution to remove from it the basic sulfate of iron suspended therein; substantially as described.

3. The method of recovering copper from sulfid ore in which it is associated with iron, which comprises roasting the ore under such conditions as to oxidize the copper and to produce ferric oxid, leaching a portion of the roasted ore with a dilute solution of sulfuric acid, thereby obtaining a copper solution low in iron, electrolyzing the solution thus obtained, thereby regenerating the acid in the spent electrolyte, leaching the said partially leached roasted ore with the spent electrolyte, thereby dissolving out the remainder of its copper and a small part of its iron, neutralizing the solution thus obtained by a fresh body of roasted ore, thereby precipitating the ferric iron of the solution as a basic sulfate of iron, quickly drawing off and filter-pressing the solution thus obtained, and electrolyzing it for the precipitation of its copper and the regeneration of its acid; substantially as described.

4. In the art of recovering copper from ores in which it is associated with iron, a cyclic operation which comprises electrolyzing a copper solution obtained from the ore, thereby regenerating the solution and making it acid leaching by means of said regenerated solution, a body of oxidized ore from which the major part of the copper has been removed thereby dissolving out of said partially leached ore the remainder of its copper and a small portion of its iron, neutralizing the free acid of the solution by means of a fresh batch of oxidized ore, thereby precipitating the ferric oxid as a basic sulfate of iron and dissolving out the major portion of the copper from the ore thus used for neutralization, withdrawing the solution thus obtained, filter-pressing it and completing the cycle by electrolyzing the clear solution thus obtained.

5. In the art of recovering copper from ore in which it is associated with iron, the method of maintaining current efficiency in the electrolysis of a solution obtained from lixiviation of the ore after previous roasting, which consists in avoiding the formation of ferrous iron during the latter part of the electrolysis by interrupting the electrolysis at a point where practically all of the iron present is in the form of ferric salts, and precipitating out the ferric salts by neutralizing the solution by means of a body of roasted ore; substantially as described.

In testimony whereof I affix my signature, in presence of two witnesses.

ELIAS A. C. SMITH.

Witnesses:
  JOHN C. PENNIE,
  M. A. BILL.